United States Patent [19]
Dementhon et al.

[11] Patent Number: 6,090,172
[45] Date of Patent: Jul. 18, 2000

[54] EXHAUST GAS FILTERING PROCESS AND UNIT WITH MODULABLE HEATING

[75] Inventors: Jean-Baptiste Dementhon, Paris; Brigitte Martin, Saint-Genis Laval; Olivier Pajot, Saint-Germain-en-Laye, all of France

[73] Assignee: Institut Francias du Petrole, Cedex, France

[21] Appl. No.: 08/968,126

[22] Filed: Nov. 12, 1997

[30] Foreign Application Priority Data

Nov. 12, 1996 [FR] France .................................. 96 13855

[51] Int. Cl.$^7$ .......................... B01D 29/66; B01D 29/52
[52] U.S. Cl. ........................ 55/282.3; 55/283; 55/287; 55/DIG. 10; 55/DIG. 30; 96/397; 96/400; 96/401; 60/303; 60/311
[58] Field of Search ........................... 55/282.3, 283, 55/284, DIG. 10, DIG. 30, 286, 287; 96/397, 400, 401, FOR 101, FOR 104; 60/311, 303

[56] References Cited

U.S. PATENT DOCUMENTS

| | | | |
|---|---|---|---|
| 5,024,054 | 6/1991 | Barris et al. .............................. | 60/274 |
| 5,171,337 | 12/1992 | Pollock .............................. | 55/DIG. 3 |
| 5,454,845 | 10/1995 | Anahara et al. .......................... | 55/267 |
| 5,457,945 | 10/1995 | Adiletta ..................................... | 55/301 |
| 5,551,971 | 9/1996 | Chadderton et al. .................. | 55/282.3 |

FOREIGN PATENT DOCUMENTS

| | | |
|---|---|---|
| 0270990 | 6/1988 | European Pat. Off. . |
| 0504422 | 9/1992 | European Pat. Off. . |
| 4012719 | 10/1991 | Germany . |
| 59-128911 | 7/1984 | Japan ...................................... 60/303 |
| 61-25907 | 2/1986 | Japan ...................................... 60/303 |
| 2239615 | 7/1991 | United Kingdom ............... 55/DIG. 1 |

*Primary Examiner*—David A. Simmons
*Assistant Examiner*—Robert A. Hopkins
*Attorney, Agent, or Firm*—Antonelli, Terry, Stout & Kraus, LLP

[57] ABSTRACT

The present invention is a filtering unit providing after-treatment of the gases emited in the exhaust of Diesel engines, comprising a filtering set which includes at least one filtering element (11, 12, 13); at least one resistive element (3) which heats a zone (121, 122, 123) of one of the at least one filtering element; at least one detection device which determines fouling of the filtering set (1); a control (5), responsive to the at least one detection device, which controls independently each of the resistive elements, according to the fouling of the filtering set and electrical power available to the at least one resistive element. The resistive elements (3) can be each wound around a zone of a filtering element. The invention further relates to the associated process.

35 Claims, 3 Drawing Sheets

EXHAUST GAS FILTERING PROCESS AND UNIT WITH MODULABLE HEATING

BACKGROUND OF THE INVENTION

1. Field of the Invention

The present invention relates to the after-treatment of gases emitted in the exhaust of Diesel vehicles.

2. Description of the Prior Art

Particulate emission standards have recently come into effect in Europe. These standards will become more stringent in the coming years. By that time, improvements linked with engines and fuels may be insufficient, even in the presence of an oxidation catalytic muffler, especially for the soluble part of the particulate emitted.

Particulate filters are a well-known exhaust gas after-treatment technique. It is thus possible to obtain filtration efficiencies above 80%. Many filter technologies have been developed to date. Examples thereof are the ceramic monolith marketed by the Coming Company, or the cartridge with coiled ceramic fibers as described in patent application WO-95/127,843.

The technical difficulty encountered for developping such a system lies in that the filter must be periodically regenerated by combustion of the soot deposit. This combustion sometimes occurs naturally when the temperature of the gases reaches by itself the level required to initiate oxidation of the particulate matter. However, average running conditions generally lead to temperatures that are too low to spontaneously initiate combustion of the particulates. This leads to clogging of the filter, which is inconvenient for the engine efficiency and eventually threatens the running thereof It is then necessary to provide artificial regeneration of the filter.

Many techniques have been developped to that effect. They can be based on changes in the running of the engine:intake throttling, exhaust throttling, advanced injection lag, or linked with energy supply in the exhaust gases or at the level of the filter (resistor, burner, micro-wave, . . . ). It is then necessary to control these various devices by means of an outer control driven by a computer. Most often, the criterion taken into account for regeneration initiation is the back pressure in the exhaust line.

In order to facilitate regeneration of particulate filters, a different approach of chemical nature consists in adding to the fuel an additive, for example an organometallic additive that is found in the soot deposit, which generally leads to a decrease in the ignition temperature and therefore to a regeneration frequency increase.

Examples of the products most commonly used as additives are copper, iron, cerium, sodium, . . . Studies show that, in the presence of such additives, partial regenerations can occur spontaneously for relatively low exhaust gas temperatures (~200° C.).

However, for certain driving modes, problems linked with the back pressure can subsist, so that an external energy supply such as electric heating can be necessary.

Concerning power consumption, most of the well-known systems using electric heating perform a global heating of the filtering element. This leads to a controlled high power consumption. Generally, the electrical power required to initiate total regeneration of the filter is high and often not compatible with the electrical resources on board the vehicle. European Patent EP-B1-0,485,179 illustrates a system based on this principle.

Furthermore, the regeneration conditions can highly depend on the fouling condition of the filter. The well-known electric heaters do not allow action according to the fouling of the filter. The present invention advantageously adapts the electrical power and the power supply in the filter to all the operating conditions of the vehicle. It also overcomes the problems of the prior art mentioned above.

SUMMARY OF THE INVENTION

The present invention provides better control of mean back pressure in the exhaust while limiting degradation of the engine efficiency. The present invention minimizes the energy supply required for regeneration of the filter by simultaneously accounting of several parameters and of the "past" of the filtering element.

The present invention allows improved operation of a particulate filter which provides energy saving as well as reliability.

The intelligent regeneration management of the present invention limits risks of degradation of the filtering element linked with excessive heat release.

The invention is a filtering unit which provides after-treatment of the gases emitted in the exhaust of Diesel engines comprising a filtering set.

According to the invention, the filtering unit comprises:

at least one filtering element;

at least one resistive element which heats a zone of a filtering element;

a unit which determines the fouling of said filtering set;

a control which controls independently each of the resistor, according to the fouling of the filtering set; and a unit which determines the available power which is associated with the control.

More particularly the resistive element or elements have the shape of spires wound around a zone of a filtering element.

The power of each resistive element is advantageously low in relation to the total electrical power available.

The filtering unit according to the invention can also comprise at least one temperature detector.

The filtering unit according to the invention can also comprise at least one throttling device associated with a filtering element.

Furthermore, the unit according to the invention can comprise a detector which detects the position of the accelerator pedal, associated with the control.

According to another aspect thereof, the invention relates to a process for implementing such a filtering unit.

More particularly, the process includes;

dividing the filtering set into several filtering elements;

providing at least one of the filtering elements with at least one resistive element which locally heats the filtering element;

detecting the fouling of the filtering set;

evaluating the electric resources available in the vehicle; and activating selectively the resistive element or elements as a function of the detected fouling and of the electrical power, under control of the control.

Thus, according to a simple embodiment of the invention, a single zone of the filtering set can be heated, for example when the back pressure reaches a critical threshold value.

According to another embodiment of the invention, the various zones are heated one after the other.

Furthermore, the process can detect the temperature at various points of the filtering set.

According to another embodiment of the invention, the coldest zone(s) of the filtering set is (are) heated.

According to another embodiment of the invention, the hottest zone(s) of the filtering set is (are) heated.

Furthermore, a throttling device can be associated, according to the invention, with at least one of the filtering elements so as to isolate the element.

More specifically, heating can be achieved in a filtering zone where fouling is greater than in the other zones, i.e. more favorable to regeneration.

According to another embodiment, heating can be achieved in a filtering zone where the nature of the soots is more favourable to regeneration.

According to an interesting feature of the invention, the resistive element(s) is (are) selectively activated according to certain running conditions of the engine such as, for example, the position of the accelerator pedal.

The advantages and features of the invention thus lie on the one hand in the division of the total resistor into several zones that can each be supplied separately. On the other hand, the strategies implemented according to the invention are specifically suited to the running conditions of the engine, to the driving mode, to the available energy resources, and to the fouling characteristics of the filtering set.

BRIEF DESCRIPTION OF THE DRAWINGS

Other features, advantages and details of the present invention will be clear from reading the description hereafter, given by way of non limitative example, with reference to the accompanying drawings wherein.

DESCRIPTION OF THE INVENTION

Figure 1:
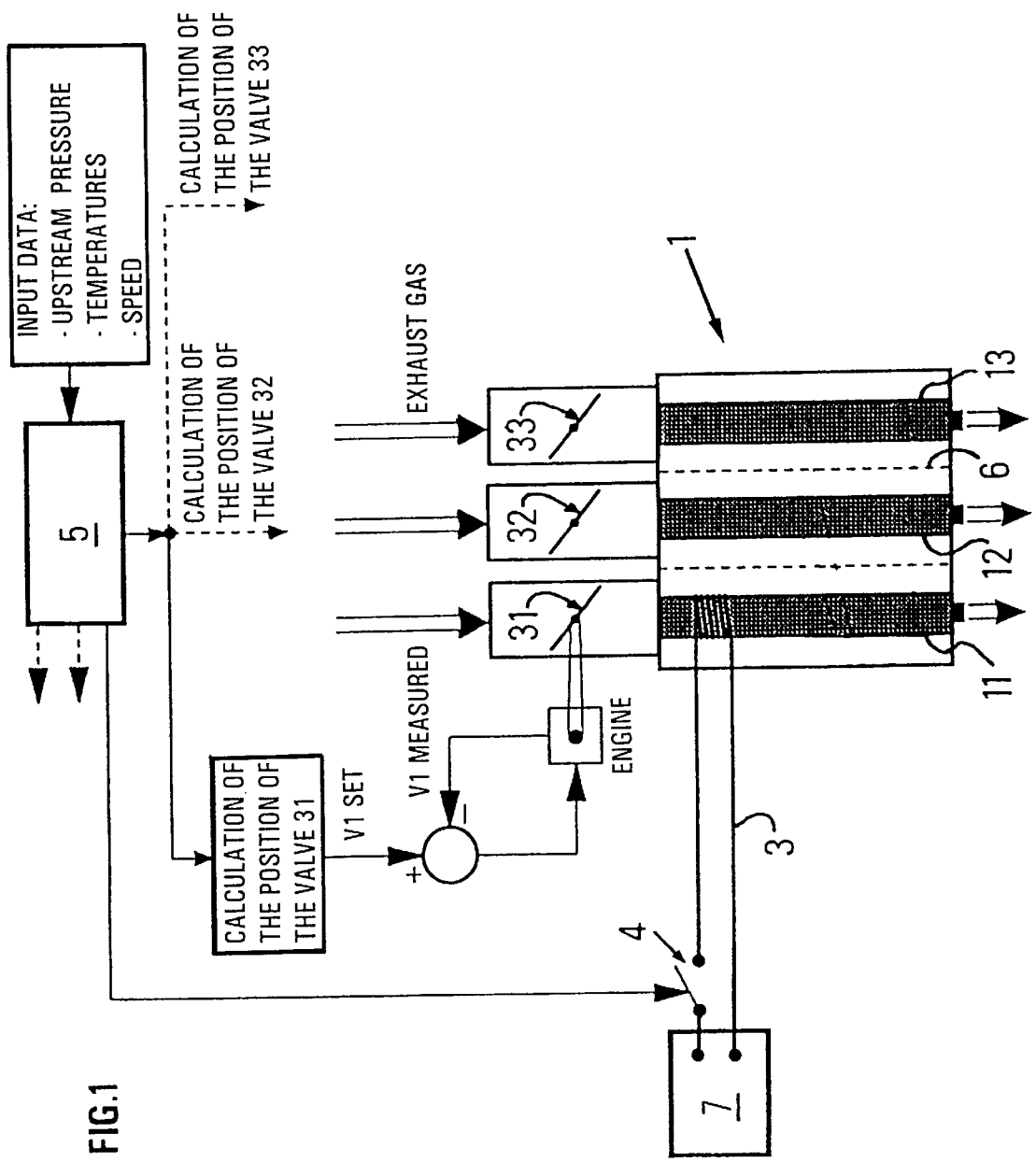
FIG. 1 is a flowsheet of a unit according to the invention.

In FIG. 1, a filtering set 1 commonly referred to as particulate filter is placed on the path of the exhaust gases whose flow is shown by double arrows. Filtering set 1 comprises several filtering elements 11, 12, 13 consisting for example of filtering cartridges marketed by the the 3M company.

Structure such as partitions 6 can be provided to divide filtering set 1 and to isolate the various filtering elements 11, 12, 13.

Figure 2:
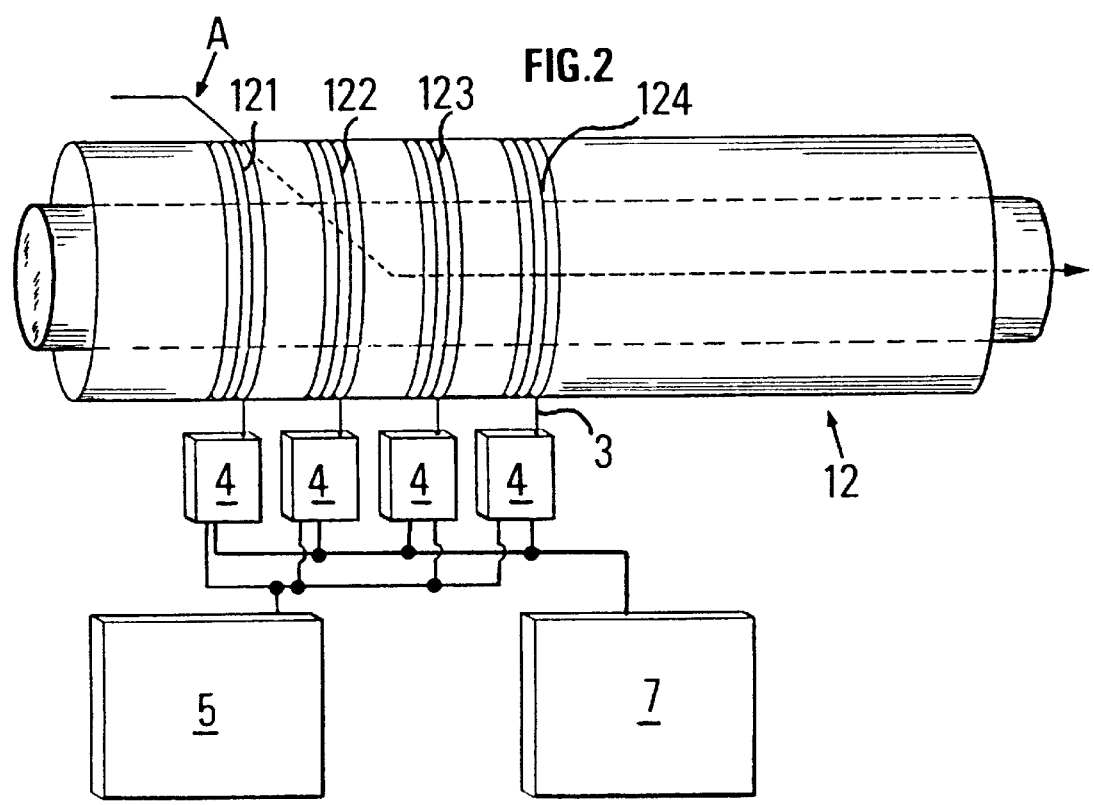
FIG. 2 is a detailed diagram of a filtering element according to the invention.

A filtering element 12 is shown in FIG. 2. This element is equipped here with several resistive elements 3, each one heating a zone 121, 122, 123, 124 of filtering element 12. More precisely, the resistor is a spiral wire wound around a filtering cartridge 12.

According to the simple embodiment of the invention, a single resistive wire 3 is wound around a zone 121 of a filtering element such as 12.

Without departing from the scope of the invention, a single zone can also be thus equipped in each filtering element.

FIG. 2, which will be commented on hereafter, allows description more throughly of one of the possible layouts of these elements.

The various resistive elements are supplied by an on-board source of power such as the battery or the alternator 7 of the vehicle.

Relays 4 or other switches control passage of the power towards each of the various resistive elements 3. Relays 4 are controlled by a control such as an electronic computer 5, according to various strategies explained hereafter.

The distribution of the various resistors 3 on each filtering element 11, 12, 13 and between the various filtering elements is judiciously achieved so as to satisfy best the strategies implemented. In other words, the filtering elements are not necessarily all equipped with the same number of heating resistors 3.

Furthermore, one or more throttling devices 31, 32, 33 can optionally cooperate with the filtering set described above. These throttle devices (valves) improve regeneration, notably as regards power consumption as explained hereafter. At least one throttling devices 31, 32, 33 is associated with a filtering element 11, 12, 13.

Moreover, various detectors (not shown in FIG. 1) supply computer 5 with input data. One pressure detector at the minimum, situated upstream from the filtering set, is necessary to determine the fouling level of the filtering set.

FIG. 2 is a simplified diagram of a filtering element according to the invention, such as a filtering cartridge 12. The exhaust gases to be treated flow through the cartridge as shown by arrow A. The total number of cartridges placed in filtering set 1 is suited to the maximum flow of exhaust gases to be treated.

Furthermore, for certain strategies, other detectors (not referenced, not shown) are used, such as a temperature detector, a device for determining the mass flow rate, such as a hot-film flowmeter for example.

On an individual cartridge 12 such as that schematically illustrated in FIG. 2, a number N of heating wires can be provided to heat the various zones 121, 122, 123, 124 of cartridge 12. According to this embodiment of the invention, which is not limitative, four heating wires are wound irrespective of each other, over part of the length of the cartridge. The number of resistors and the cartridge length covered by the resistors are suited to the strategies defined.

The heating wires can be, for example, wires marketed by the Thermocoax company.

The alternator of the vehicle can constitute the source of power of resistive elements 3 which are individually low power consumers. The power supply must remain compatible with the instantaneous resources of the source of power and with requirements linked with a consumption limitation. A power relay 4 is associated with each resistive element 3. Each relay 4 is controlled by computer 5 according to predetermined strategies that take notably into account the running conditions of the engine and of the fouling of the filtering set. These strategies are stored in computer 5. Definition of the strategies must keep fouling below a certain threshold, on the one hand in order to limit the back pressure undergone by the engine, and on the other hand prevent any local accumulation of matter likely to eventually lead to a premature degradation of the filter.

A first implementation of the invention activates a single resistor as soon as the back pressure exceeds a critical threshold so as to lower the back pressure imposed on the engine with a minimum amount of energy.

Then, according to the strategy selected, other resistors can be activated, together or separately.

Another way of activating the locally installed various resistors can heat only the zones of filter 1 where the temperature remains below a given value which normally corresponds to a regeneration initiation.

This strategy is particularly interesting knowing that, in the case of large-size filters, the temperatures in the zones of the filter which are at the furthest distance from the engine can be 50° C. less than the temperatures at the filter inlet. In this case, selective heating of the least hot zones favors combustion on the whole filter since a "spontaneous" regeneration then occurs in the zones of the filter which are the closest to the engine, whereas an "induced" regeneration appears in the peripheral zones of the filter.

Such a partial heating favors propagation of the regeneration. In fact, if regeneration starts preferentially in an area of the filter, the flow rate through this area then suddenly increases. This deprives the other areas of oxygen, thus making combustion more difficult therein and creating fouling heterogeneities. The existence of highly fouled zones where combustion can cause great heat releases is detrimental to the life of the filter. This phenomenon can therefore be prevented through local heating according to the invention.

According to another aspect thereof, the present invention activates the resistor(s) associated with the hottest zones where the temperature is close to the temperature initiating regeneration. A very low electrical power thus allows initiation of combustion thanks to a limited number of resistors. The heat released by the combustion in the heated zones thus serves to initiate combustion in the neighbouring zones.

Without departing from the scope of the invention, it is posible to combine partial heating of a zone (121) of a filtering element (11) with partial throttling of the element.

Figure 3:
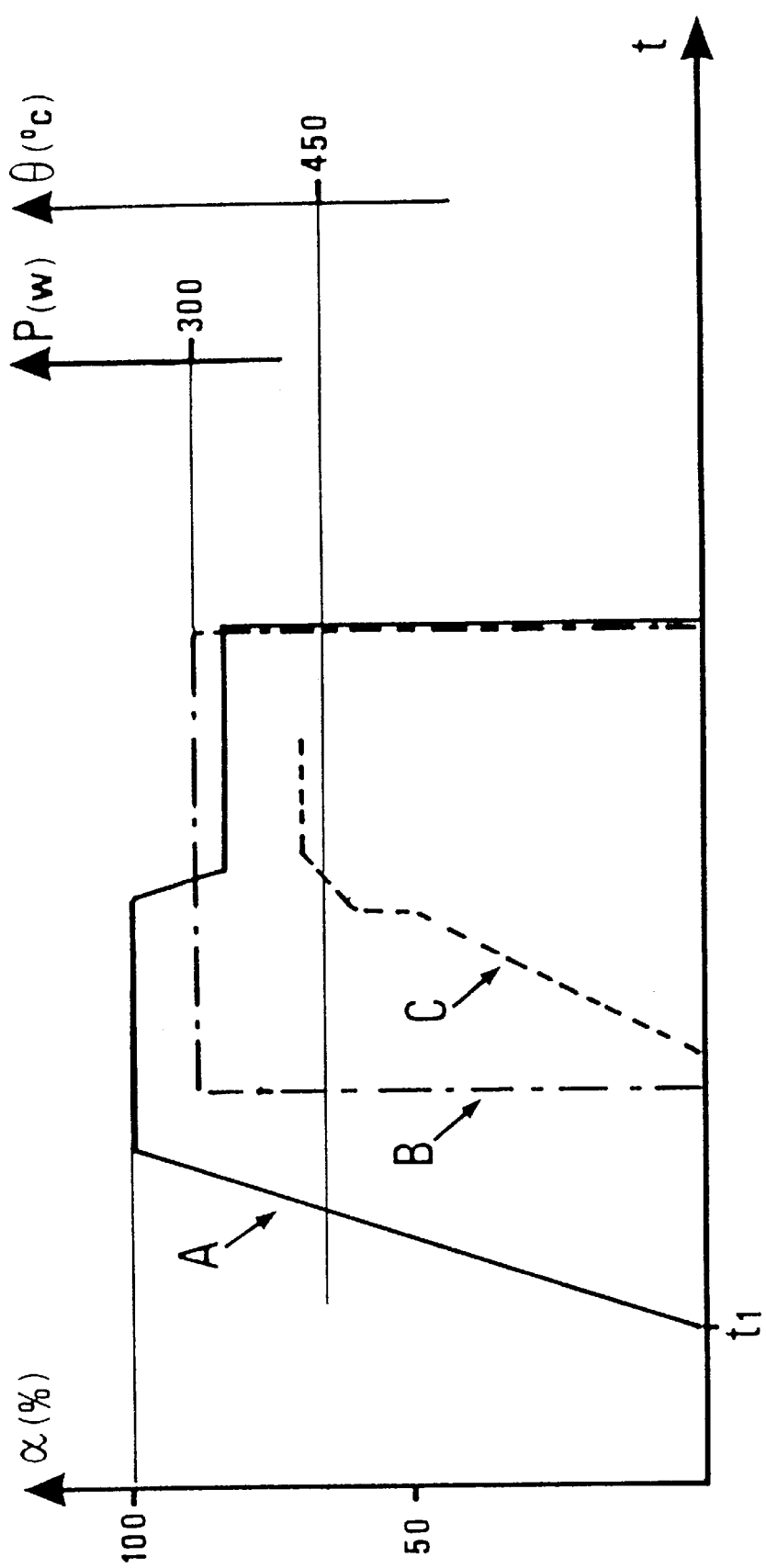
FIG. 3 is a set of curves showing the relation between the opening of a valve, the electrical power used and the temperature in the filtering set.

This method of operation is illustrated by FIG. 3. In this figure, curve A (in full line) represents the closing angle α of a valve 31, 32, 33. Curve B (in dot-and-dash line) represents the electrical power required for heating and curve C (in dotted line) relates to the temperature in the throttled element. Regeneration is set off at the time $t_1$. The valve then starts to close progressively and the throttled element is simultaneously heated.

Closing of the valve and heating being performed quasi simultaneously produces a synergism between the two operations, the effect of the closing of the valve reinforcing the effect of heating.

As soon as combustion has started in the zone in question, the valve is progressively re-opened since the expected effect has occured. This solution allows regeneration while saving energy.

According to another embodiment of the invention, all of the valves can be controlled so as to create a fouling heterogeneity, as regards the amount as well as the nature of the soots deposited, between the various filtering elements. One thus chooses to heat preferentially the zones of a filtering element having the best regeneration chances (higher fouling, hydrocarbon-richer soots). The power required for regeneration will then be low since the flow of gas to be heated is low and the combustion conditions are favorable.

French patent application EN.96/11,292 filed by the Assignees explains strategies allowing heterogeneities to be created.

Finally, according to another possibility of operation according to the invention, the total power consumed for regeneration can be determined as a function of the available electrical resources. In particular, the engine speed can be taken into account to evaluate the capacities of the alternator, or the battery voltage, or any other available information likely to be linked with the available power, such as for example a diagnosis on the other utilities working during regeneration.

It is also possible, according to the invention, to activate selectively the resistive element(s) as a function of certain running conditions of the engine, such as for example the position of the accelerator pedal. When the accelerator pedal is in the maximum position, i.e. when the driver requires a maximum engine power, the resistive elements are automatically deactivated in order not to draw too much energy and to reserve the maximum power for the engine.

What is claimed is:

1. A filtering set which treats exhaust gases of Diesel engines, comprising:
   at least one cylindrical filtering element, each cylindrical filtering element having a plurality of resistive elements each resistive element comprising at least one turn of wire wrapped on one of the at least one cylindrical filtering element and engaging a cylindrical portion of the cylindrical filtering element and being disposed along a longitudinal axis of the cylindrical filtering element to heat a portion of the cylindrical filtering element when electrical power is applied thereto;
   at least one detection device which determines at least fouling of the at least one filtering element; and
   a control element, responsive to the at least one detection device, which controls independently each of the at least one resistive elements according to the fouling of the at least one filtering element and electrical power made available to the at least one resistive element during operation of the filtering set to treat exhaust gases.

2. A filtering unit as claimed in claim 1, wherein the at least one resistive element is wound around a zone of a filtering element.

3. A filtering unit as claimed in claim 1, wherein the control element controls electrical power consumed by each resistive element so that the electrical power consumed is a fraction of the total available electrical power.

4. A filtering unit as claimed in claim 2, wherein the control element controls electrical power consumed by each resistive element so that the electrical power consumed is a fraction of the total available electrical power.

5. A filtering unit as claimed in claim 1, further comprising at least one temperature detector located upstream of the at least one filtering element and coupled to the control element.

6. A filtering unit as claimed in claim 2, further comprising at least one temperature detector located upstream of the at least one filtering element and coupled to the control element.

7. A filtering unit as claimed in claim 3, further comprising at least one temperature detector located upstream of the at least one filtering element and coupled to the control element.

8. A filtering unit as claimed in claim 4, further comprising at least one temperature detector located upstream of the at least one filtering element and coupled to the control element.

9. A filtering unit as claimed in claim 1, further comprising at least one throttling device associated with the at least one filtering element.

10. A filtering unit as claimed in claim 2, further comprising at least one throttling device associated with the at least one filtering element.

11. A filtering unit as claimed in claim 3, further comprising at least one throttling device associated with the at least one filtering element.

12. A filtering unit as claimed in claim 4, further comprising at least one throttling device associated with the at least one filtering element.

13. A filtering unit as claimed in claim 5, further comprising at least one throttling device associated with the at least one filtering element.

14. A filtering unit as claimed in claim 6, further comprising at least one throttling device associated with the at least one filtering element.

15. A filtering unit as claimed in claim 7, further comprising at least one throttling device associated with the at least one filtering element.

16. A filtering unit as claimed in claim 8, further comprising at least one throttling device associated with the at least one filtering element.

17. A filtering unit as claimed in claim 1, further comprising a detector, associated with the control, which detects position of an accelerator pedal.

18. A process for after treatment of gases contained in exhaust of a Diesel engine in a vehicle comprising:

providing at least one cylindrical filtering element, each cylindrical filtering element having a plurality of resistive elements, each resistive element comprising at least one turn of wire wrapped on one of the at least one cylindrical filtering element and engaging a cylindrical portion of the cylindrical filtering element and being disposed along a longitudinal axis of the cylindrical filtering element to heat a Portion of the cylindrical filtering element when electrical power is applied thereto;

detecting fouling of the at least one filtering element;

providing for electrical resources for providing power to the at least one resistive element;

evaluating electrical resources available to provide electrical power to the at least one resistive element; and activating selectively the at least one resistive element as a function of the detected fouling and the evaluated electrical resources available to provide electrical power to the at least one resistive element under control of a control element.

19. A process as claim in claim 18, where different resistive elements are heated sequentially.

20. A process as claimed in claim 18, comprising detecting temperature at different points of the at least one filtering element to the control element which uses the detected temperature in control of activating the at least one resistive element.

21. A process as claimed in claim 19, comprising detecting temperature at different points of the at least one filtering element to the control element which uses the detected temperature in control of activating the at least one resistive element.

22. A process as claimed in claim 20, wherein a zone of the at least one filtering element having a temperature farthest from a regeneration temperature is heated.

23. A process as claimed in claim 21, wherein a zone of the at least one filtering element having a temperature farthest from a regeneration temperature is heated.

24. A process as claimed in claim 20, wherein a zone of the at least one filtering element having a temperature nearest a regeneration temperature is heated.

25. A process as claimed in claim 21, wherein a zone of the at least one filtering element having a temperature nearest a regeneration temperature is heated.

26. A process as claimed in claim 20 further comprising:

associating a throttling device with at least one of the filtering elements so as to isolate the at least one filtering element which is associated with the throttling element.

27. A process as claimed in claim 21 further comprising:

associating a throttling device with at least one of the filtering elements so as to isolate the at least one filtering element which is associated with the throttling element.

28. A process as claimed in claim 22 further comprising:

associating a throttling device with at least one of the filtering elements so as to isolate the at least one filtering element which is associated with the throttling element.

29. A process as claimed in claim 23 further comprising:

associating a throttling device with at least one of the filtering elements so as to isolate the at least one filtering element which is associated with the throttling element.

30. A process as claimed in claim 24 further comprising:

associating a throttling device with at least one of the filtering elements so as to isolate the at least one filtering element which is associated with the throttling element.

31. A process as claimed in claim 25 further comprising:

associating a throttling device with at least one of the filtering elements so as to isolate the at least one filtering element which is associated with the throttling element.

32. A process as claimed in claim 20 wherein heating by activating the at least one resistive element is achieved in a filtering zone of the at least one filtering element where fouling is above a predetermined level required for regeneration.

33. A process as claimed in claim 20 wherein activation of the at least one resistive element is also a function of running conditions of the Diesel engine.

34. A process as claimed in claim 33, wherein the activation of the at least one resistive element is a function of a position of an accelerator pedal of the vehicle.

35. A process as claimed in claim 34 wherein the activation of the at least one resistive element is deactivated when the accelerator pedal commands maximum acceleration of the vehicle.

* * * * *